United States Patent
DeLeon et al.

(10) Patent No.: US 11,844,990 B2
(45) Date of Patent: Dec. 19, 2023

(54) LAUNCH MONITOR

(71) Applicant: Full-Swing Golf, Inc., Carlsbad, CA (US)

(72) Inventors: John DeLeon, Carlsbad, CA (US); Daniel Nicora, Temecula, CA (US); Zongbo Wang, Carlsbad, CA (US)

(73) Assignee: Full-Swing Golf, Inc., Carlsbad, CA (US)

( * ) Notice: Subject to any disclaimer, the term of this patent is extended or adjusted under 35 U.S.C. 154(b) by 0 days.

(21) Appl. No.: 17/726,373

(22) Filed: Apr. 21, 2022

(65) Prior Publication Data

US 2022/0241663 A1     Aug. 4, 2022

Related U.S. Application Data

(63) Continuation of application No. 16/678,322, filed on Nov. 8, 2019, now Pat. No. 11,311,789.

(60) Provisional application No. 62/757,571, filed on Nov. 8, 2018.

(51) Int. Cl.
*A63B 69/36* (2006.01)
*A63B 24/00* (2006.01)
*G01S 13/58* (2006.01)
*G01S 13/82* (2006.01)

(52) U.S. Cl.
CPC ...... *A63B 69/3658* (2013.01); *A63B 24/0021* (2013.01); *G01S 13/584* (2013.01); *G01S 13/82* (2013.01); *A63B 2024/0031* (2013.01)

(58) Field of Classification Search
CPC .......................................... A63B 2024/0031
See application file for complete search history.

(56) References Cited

U.S. PATENT DOCUMENTS

| | | | |
|---|---|---|---|
| 5,363,297 A | * | 11/1994 | Larson .............. G06T 7/292 342/126 |
| 5,700,204 A | | 12/1997 | Teder |
| 6,148,271 A | | 11/2000 | Marinelli |
| 6,244,971 B1 | | 6/2001 | Mihran |
| 6,816,185 B2 | | 11/2004 | Harmath |
| 7,321,330 B2 | * | 1/2008 | Sajima .............. G01S 13/867 473/150 |
| 8,085,188 B2 | | 12/2011 | Tuxen |
| 8,189,857 B2 | | 5/2012 | Johnson et al. |
| 8,400,346 B2 | | 3/2013 | Hubbard et al. |

(Continued)

FOREIGN PATENT DOCUMENTS

| EP | 3211445 B1 | 6/2019 |
|---|---|---|
| WO | 2006002640 A1 | 1/2006 |

OTHER PUBLICATIONS

International Search Report and Written Opinion dated Feb. 20, 2020 in International Patent Application No. PCT/US2019/060519.

*Primary Examiner* — Seng H Lim
(74) *Attorney, Agent, or Firm* — Veros Legal Solutions, LLP

(57) ABSTRACT

A launch monitor for golf training includes both a continuous wave radar transmitter and a frequency modulated continuous wave radar transmitter. A first set of golf ball trajectory parameters are estimated with the continuous wave radar transmitter and a second, different set of golf ball trajectory parameters are estimated with the frequency modulated continuous wave radar transmitter. The array of transmitters and receivers may be non-uniform.

14 Claims, 10 Drawing Sheets

(56) References Cited

U.S. PATENT DOCUMENTS

| | | |
|---|---|---|
| 8,535,169 B2 | 9/2013 | Molinari |
| 8,845,442 B2 | 9/2014 | Tuxen |
| 8,912,945 B2 | 12/2014 | Tuxen |
| 8,996,088 B2 | 3/2015 | Dacso et al. |
| 9,036,864 B2 | 5/2015 | Johnson et al. |
| 9,283,464 B2 | 3/2016 | Nipper et al. |
| 9,500,743 B2 | 11/2016 | Reid et al. |
| 9,592,427 B2 | 3/2017 | Kitazaki et al. |
| 9,645,235 B2 | 5/2017 | Tuxen |
| 9,855,481 B2 | 1/2018 | Tuxen et al. |
| 9,857,459 B2 | 1/2018 | Tuxen |
| 9,868,044 B2 | 1/2018 | Johnson et al. |
| 9,958,527 B2 | 5/2018 | Tuxen |
| 10,015,412 B2 | 7/2018 | Marcellin et al. |
| 10,052,542 B2 | 8/2018 | Tuxen et al. |
| 10,151,831 B2 | 12/2018 | Johnson |
| 10,898,757 B1 | 1/2021 | Johansson et al. |
| 2002/0107078 A1 | 8/2002 | Collins |
| 2007/0075891 A1* | 4/2007 | Sajima .................... G01S 13/87 342/107 |
| 2007/0293331 A1 | 12/2007 | Tuxen |
| 2008/0139330 A1 | 6/2008 | Tuxen |
| 2008/0261711 A1 | 10/2008 | Tuxen |
| 2012/0068879 A1 | 3/2012 | Tuxen |
| 2013/0304417 A1 | 11/2013 | Mooney et al. |
| 2014/0191896 A1 | 7/2014 | Johnson et al. |
| 2016/0048975 A9 | 2/2016 | Tuxen et al. |
| 2016/0247292 A1 | 8/2016 | Tuxen et al. |
| 2016/0306035 A1 | 10/2016 | Johnson |
| 2016/0306036 A1 | 10/2016 | Johnson |
| 2016/0306037 A1 | 10/2016 | Johnson |
| 2016/0320476 A1 | 11/2016 | Johnson |
| 2016/0339320 A1* | 11/2016 | Johnson ................ G06F 1/1626 |
| 2017/0072261 A1 | 3/2017 | Kim et al. |
| 2017/0085771 A1 | 3/2017 | Schwager et al. |
| 2017/0248692 A1 | 8/2017 | Zivkovic |
| 2017/0254892 A1 | 9/2017 | Tuxen |
| 2018/0011183 A1 | 1/2018 | Tuxen |
| 2018/0011184 A1 | 1/2018 | Toit et al. |
| 2018/0120428 A1 | 5/2018 | Tuxen et al. |
| 2018/0156914 A1 | 6/2018 | Tuxen et al. |
| 2018/0239012 A1 | 8/2018 | Johnson |
| 2018/0249135 A1 | 8/2018 | Yeo et al. |
| 2018/0318644 A1 | 11/2018 | Forsgren |
| 2019/0282881 A1 | 9/2019 | Tuxen et al. |
| 2019/0391254 A1* | 12/2019 | Asghar ............... H04N 5/23222 |
| 2020/0155899 A1* | 5/2020 | Hixenbaugh ...... A63B 24/0003 |
| 2021/0018612 A1* | 1/2021 | Asghar ............... H04N 5/23218 |
| 2022/0241663 A1* | 8/2022 | DeLeon ................ G01S 13/583 |

\* cited by examiner

LAUNCH MONITOR

RELATED APPLICATIONS

This application claims priority to U.S. application Ser. No. 16/678,322 filed on Nov. 8, 2019. This application also claims priority to U.S. Provisional Application 62/757,571, filed on Nov. 8, 2018.

BACKGROUND

One of the main attractions of golf is the continual challenge to improving one's game. To become an adept golfer and to maintain golfing proficiency, a significant amount of practice is required. However, in order to reap maximum benefit from that practice, it is desirable that the golfer receive feedback on his or her performance in relative temporal proximity to the performance. In some cases, commercially available "launch monitor" systems are used to gather information on a golf club and struck golf ball during and immediately after a player swing. Current golf launch monitors use radars and/or cameras to measure the dynamics of the golfer swing and ball behavior following impact. These systems are used by golfers as training and practice aids to help improve their game. The accuracy and repeatability of the measurements made by these systems is paramount in their usefulness. There are certain limitations that current monitors face in achieving these goals. There is a standard list of variables that golfers expect to receive feedback on from a launch monitor.

It should be noted that this Background is not intended to be an aid in determining the scope of the claimed subject matter nor be viewed as limiting the claimed subject matter to implementations that solve any or all of the disadvantages or problems presented above. The discussion of any technology, documents, or references in this Background section should not be interpreted as an admission that the material described is prior art to any of the subject matter claimed herein.

SUMMARY

It is understood that various configurations of the subject technology will become apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

In one implementation, a launch monitor for golf training comprises a continuous wave radar transmitter, a frequency modulated continuous wave radar transmitter; and a plurality of radar receivers configured to receive Doppler radar signals transmitted by the continuous wave radar transmitter and the frequency modulated continuous wave radar transmitter reflected off a struck golf ball. A processor is coupled to the continuous wave radar transmitter, the frequency modulated continuous wave radar transmitter and the plurality of radar receivers, and the processor is configured to process the Doppler radar signals from the radar receivers. In some implementations, the launch is configured to estimate a distance between a struck golf ball and the launch monitor based at least in part on the signals transmitted by the frequency modulated continuous wave radar transmitter.

In another implementation, a method of measuring a plurality of parameters of a golf ball trajectory in real time is provided. The method comprises irradiating the golf ball with continuous wave radar and frequency modulated continuous wave radar, receiving Doppler signals associated with continuous wave radar and frequency modulated continuous wave radar reflecting off the golf ball, estimating a first set of golf ball trajectory parameters with the continuous wave radar Doppler signals, and estimating a second, different set of golf ball trajectory parameters with the frequency modulated continuous wave radar Doppler signals.

In another implementation, a golf ball launch monitor comprises a plurality of radar receive antennas and a plurality of radar transmit antennas. The plurality of radar receive antennas and the plurality of radar transmit antennas are arranged in a non-uniform array.

BRIEF DESCRIPTION OF THE DRAWINGS

Various embodiments are discussed in detail in conjunction with the Figures described below, with an emphasis on highlighting the advantageous features. These embodiments are for illustrative purposes only and any scale that may be illustrated therein does not limit the scope of the technology disclosed. These drawings include the following figures, in which like numerals indicate like parts.

DETAILED DESCRIPTION

The following description and examples illustrate some exemplary implementations, embodiments, and arrangements of the disclosed invention in detail. Those of skill in the art will recognize that there are numerous variations and modifications of this invention that are encompassed by its scope. Accordingly, the description of a certain example embodiment should not be deemed to limit the scope of the present invention.

Implementations of the technology described herein are directed generally to sensing of parameters such as spin, velocity, and distance for a traveling object. Tracking a golf ball is one advantageous example.

Figure 1A:
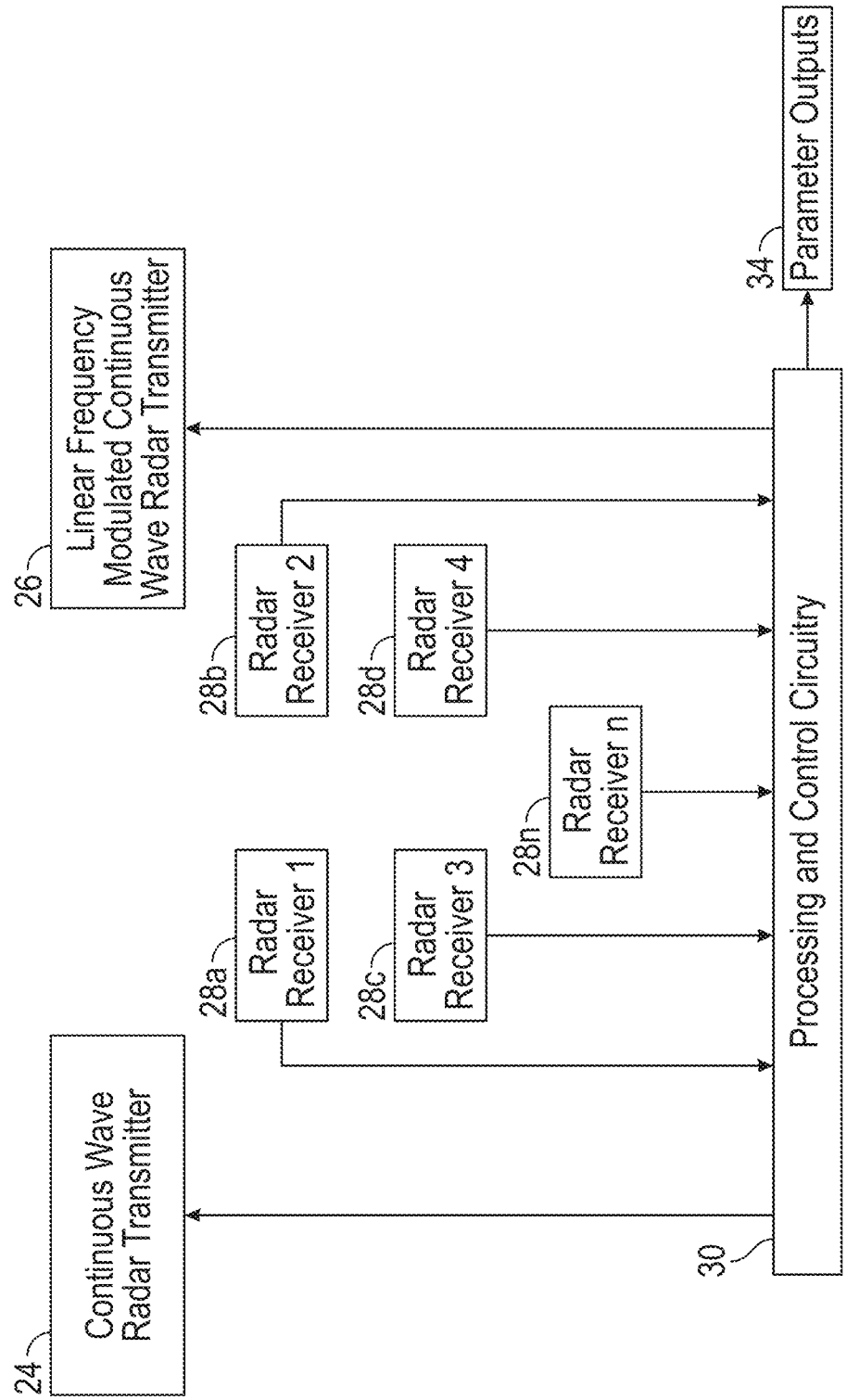
FIG. 1A is a hardware block diagram for a launch monitor according to some embodiments.
Figure 1B:
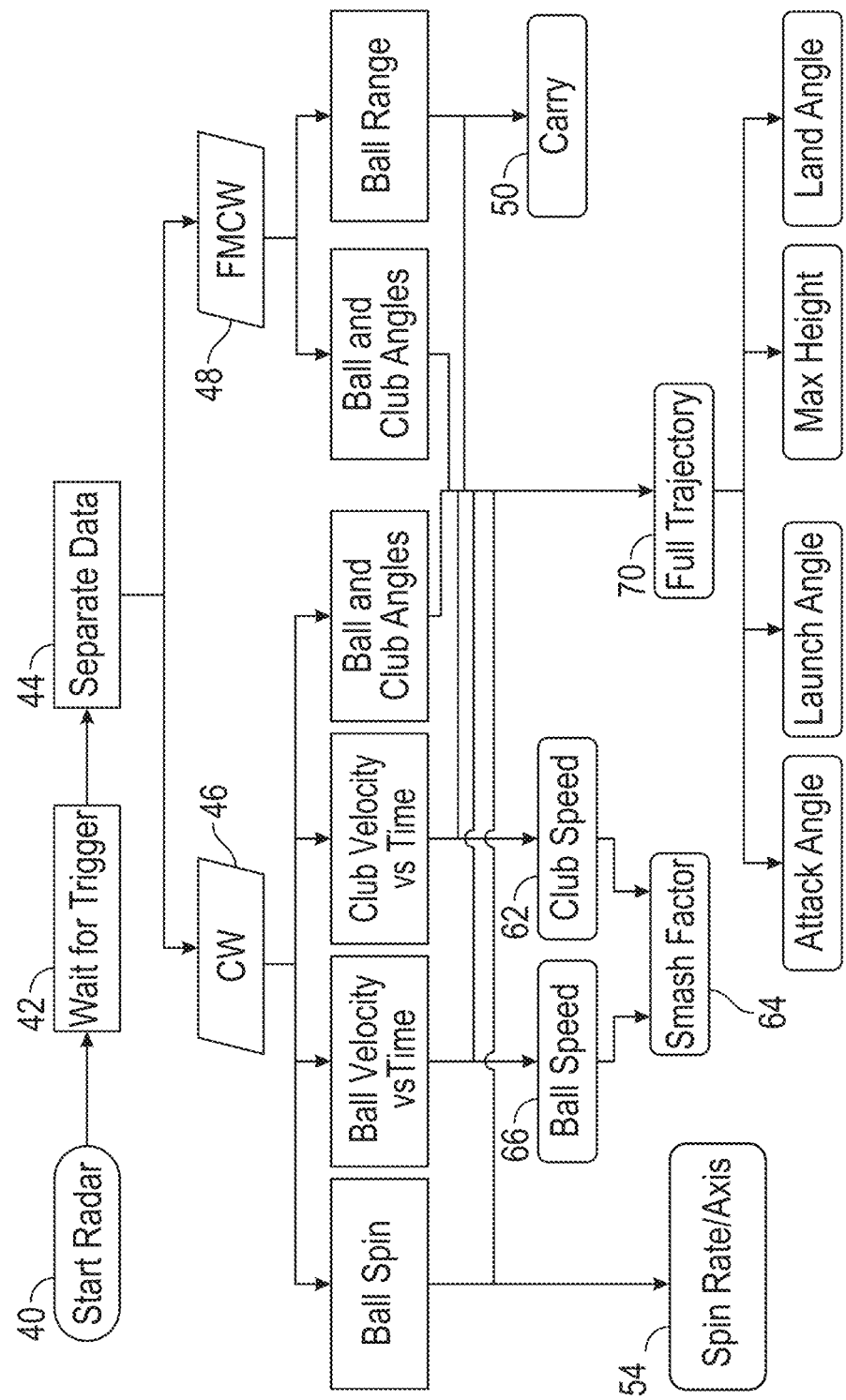
FIG. 1B is a block diagram of a processing data flow for a launch monitor according to some embodiments.

FIG. 1A shows a simplified block diagram of a launch monitor in some implementations of the principles described herein. FIG. 1B gives an overview of data collection and analysis from the launch monitor radar data of ten of the most commonly used golf swing and ball characteristics in accordance with one embodiment. Depending on the embodiment, different subsets of these variables are measured directly or back-calculated based on the measurements taken and ball flight models. It is one aspect of some of the embodiments described herein that a more comprehensive group of these parameters are measured or calculated from measurements with simple mathematical functions of measurements without first requiring the generation of a complete ball flight path model from the measurements taken in the time period immediately after the ball is struck.

As shown in FIG. 1A, the launch monitor includes two radar transmitters. One is a continuous wave (CW) radar transmitter 24 which is conventional for currently commercially available golf launch monitors. A continuous wave radar signal has essentially constant frequency throughout the signal duration. Another radar transmitter provided in some embodiments of the launch monitor is a frequency modulated continuous wave radar (FMCW) designated 26 in FIG. 1A. In some advantageous embodiments, the frequency modulated continuous wave radar is a linear frequency modulated continuous wave radar (LFMCW). Frequency modulated radar signals vary in frequency in a defined pattern that facilitates collection of various kinds of information about a target object. LFMCW is typically formed as a series of sawtooth (in the frequency domain) "chirps" of linearly increasing frequency for a defined duration. These signals have advantages in direct radar distance measurement. This combination has not been utilized in a golf launch monitor, and dramatically improves the ability to directly measure range/carry for a struck golf ball hundreds of yards downrange after being struck.

Also shown in FIG. 1A is a plurality of radar receivers 28a through 28n. Processing and control circuitry 30 drives the transmitters 24, 26, and processes Doppler reflections that are acquired by the radar receivers 28. The transmitters and receivers may be configured to operate at about 24 GHz, which corresponds to a wavelength of a little more than a centimeter. The processing and control circuitry outputs parameters 34 regarding the characteristics of the club swing and flight path of the golf ball during the swing and after the golf ball is struck by the club. The two transmitters may be enabled in a time division manner, one transmitter for CW, and one for LFMCW. Each may transmit for 128 LFMCW chirps or the equivalent time for CW. Different antennas are used for each transmitter in the embodiments shown herein, but one transmit antenna could be shared between the two transmitters. Simultaneous transmission could also be performed using sub-bands of the transmission band (e.g. sub-bands of the K band). All four receivers (Rx) may be used simultaneously for detecting reflected Doppler signals with the processing and control circuitry 30 handling various tasks such as digital beam forming.

FIG. 1B shows aspects of the data acquisition and processing path that may be performed by the launch monitor of FIG. 1A. Referring now to FIG. 1B, the radar transmitters are activated at block 40. Typically, the radar signals are transmitted and the launch monitor is buffering received Doppler data continuously, but not processing the data to generate golf ball trajectory parameters until after a triggering event at block 42. When a trigger event occurs, such as recognition of a swinging club, the data following the triggering event 42 is routed to the processing path for generating the desired golf ball trajectory parameters. At block 44, the system may separate Doppler signal data generated from the CW signals from the LFCW signals to use the data separately for different estimating club swing and golf ball trajectory parameters. FIG. 1B and Table 1 below illustrates the radar data and computations that may be used for generating different golf swing and ball parameters in some embodiments:

| Parameter | Radar Signal | Measured/Calculated |
|---|---|---|
| Club speed at contact | CW | Measured (Frequency shifts) |
| Ball speed at contact | CW | Measured (Frequency shifts) |
| Spin rate leaving tee | CW | Measured (Frequency shifts) |
| Spin axis leaving tee | CW | Measured (Frequency shifts) |
| Carry distance | FMCW | Measured (Phase shifts) |
| Side component | FMCW | Measured (Phase shifts) |
| Smash factor | CW | Calculated (Ball speed/Club Speed) |
| Club path | CW | Measured (Frequency and phase shifts) |
| Attack angle | CW - FMCW | Calculated (Tangent of club path at tee) |
| Launch angle | CW - FMCW | Calculated (Ball path off tee) |
| Face angle | CW - FMCW | Calculated (Club and ball path off tee) |
| Total distance | CW - FMCW | Flight path model with measurements |
| Total side component | CW - FMCW | Flight path model with measurements |

The above is an example only, and a variety of data sources and data processing algorithms could be used as alternatives.

It is one advantageous aspect of the system as described in FIG. 1B and Table 1 that the carry distance and side component are derived directly from radar signal measurements with the FMCW signals that supplement conventional CW signals in these embodiments. In some embodiments, only the last two parameters of Table 1 utilize a complete model of ball flight for generating the estimated values.

Referring again to FIG. 1B, CW signals 46 may be used to measure ball spin, ball velocity, club velocity and the ball and club trajectory angles in the time around club impact with the ball. From ball and club Doppler velocity data, ball speed 66 and club speed 62 at impact can be estimated, and smash factor 64 derived from these estimates. The FMCW signals 48 may be used to measure the distance from the tee to the ball as it travels away from the tee. A direct distance measurement can be made for over 200 meters of travel down range with FMCW radar techniques, allowing ball carry 50 to be directly and accurately measured at long distances. The FMCW signals can also be used to measure ball and club angles, which can be combined with similar CW measurements to improve accuracy of these measurements, which are very important in computing an accurate model of the entire ball flight path after the ball is struck. Using all the measured and directly calculated parameters, a full trajectory model of the ball flight 70 can be computed, and an additional variety of parameters can be estimated as desired.

Figure 2:
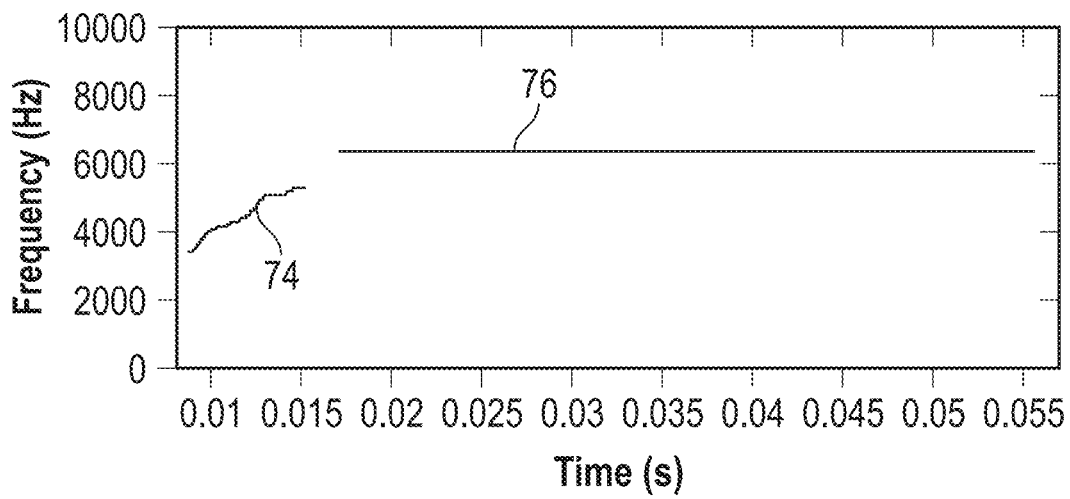
FIG. 2 is an example of Doppler data acquired during a swing of a golf club and corresponding launch of a golf ball.

FIG. 2 shows an example spectrogram from CW signals for about 50 ms of club and ball travel. The club creates track 74, and the ball creates track 76. The frequencies on the y-axis are converted to velocities. For this swing, ball velocity was 93.7 miles per hour, and club speed was 73.7 miles per hour. This generates a smash factor of 1.27.

Figure 3:
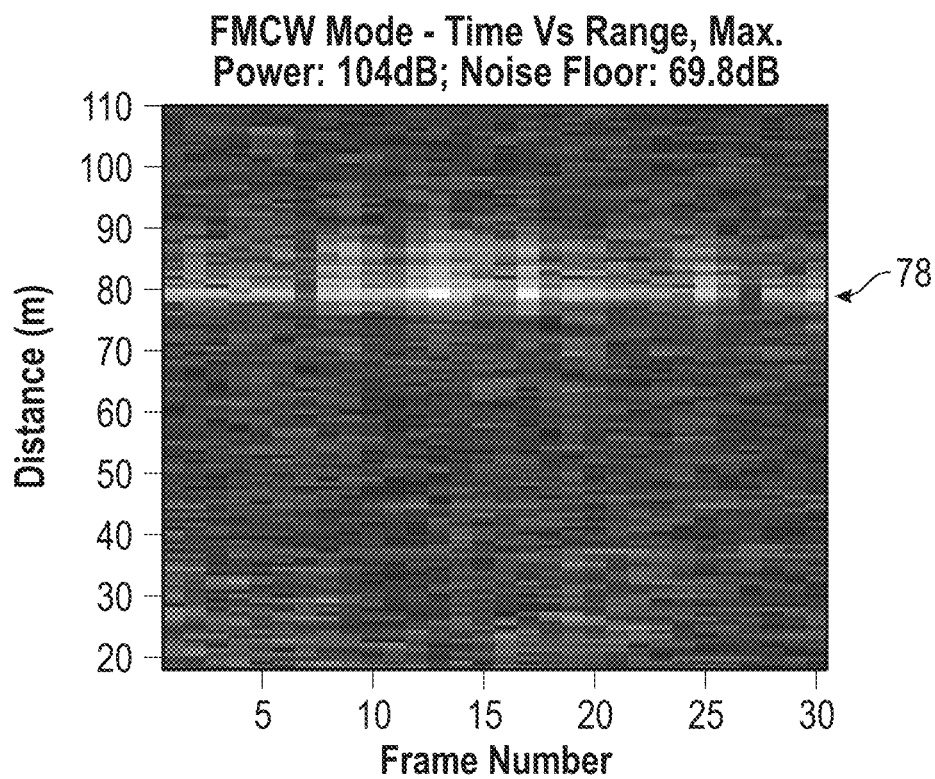
FIG. 3 is an example of Doppler data acquired from a moving golf ball when 75 meters from the launch monitor.

FIG. 3 is an example signal 78 in FMCW mode of a ball 75 m away from the launch monitor system swinging in a circle on a line. It has been found that the FMCW distance measurement can be accurate out to 250 m or more.

Figure 4A:
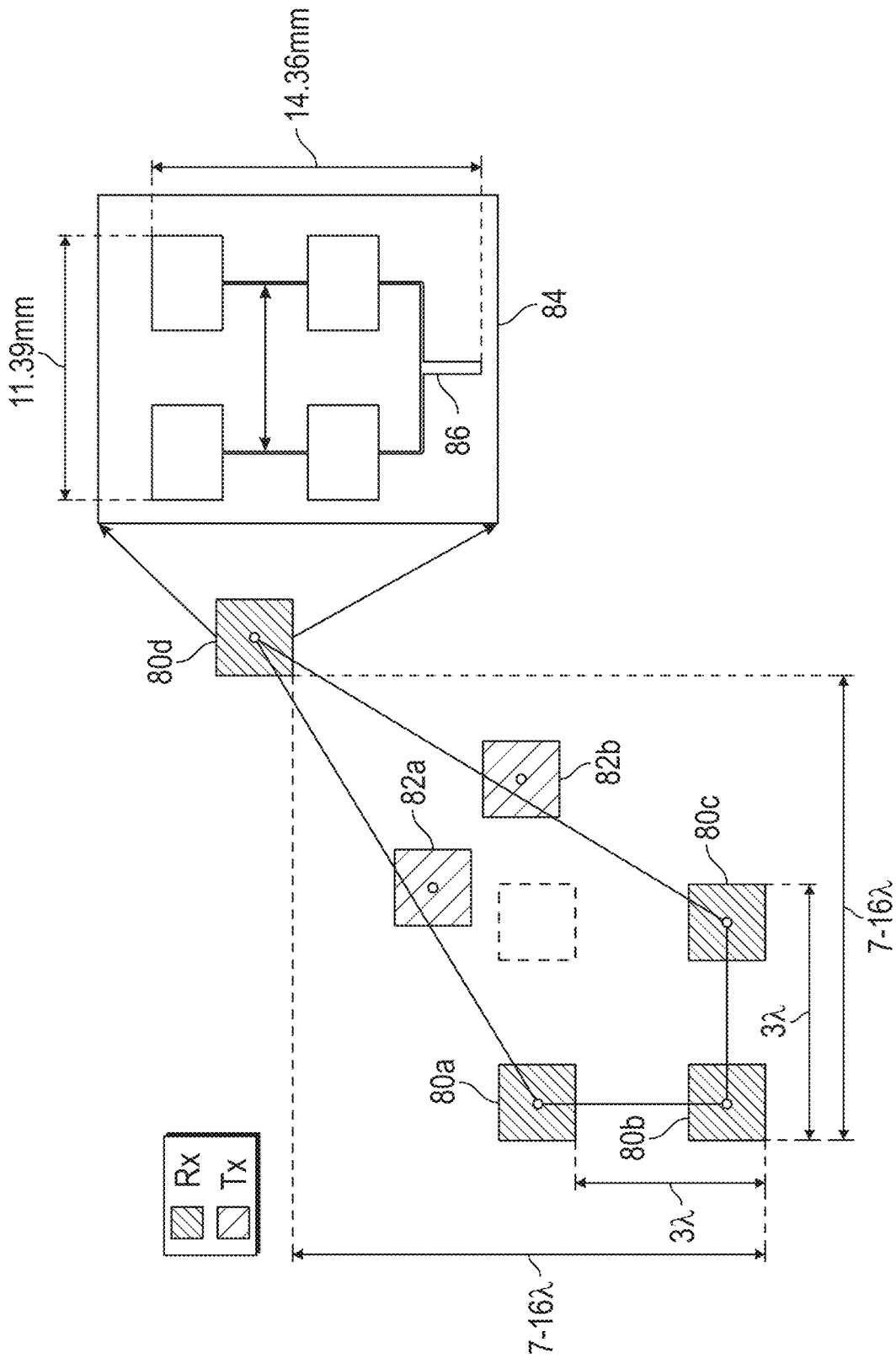
FIGS. 4A, 4B, and 4C illustrate an example non-uniform antenna array according to some embodiments.

FIG. 4A shows a non-uniform radar antenna layout that can use both CW and FMCW radar transmission to measure spin rate, spin axis, and range for a golf ball after it is struck by a golf club. It has been found by the inventors that a non-uniform antenna array allows for a richer receive signal of phase and frequency shifts that improve the accuracy of the radar system. In the embodiment of FIG. 4A, there are four receive antennas 80a, 80b, 80c, and 80d and two transmit antennas 82a and 82b. Each square 80a-d, 82a-b represents one antenna. As shown in box 84, an "antenna" is a piece of electrically conductive material, often having design similar to that shown in box 84, wherein the entire piece of conductive material is connected to a drive circuit by a common feed line 86. The black dots on the antenna squares of FIG. 4A represent in this embodiment the center of a single antenna, for example of the type shown in box 84.

As can be seen in FIG. 4A, the four receive antennas 80 are not arranged uniformly with respect to each other. In this embodiment, antenna 80d is significantly farther away from the antennas 80a, 80b, and 80c than the antennas 80a, 80b, and 80c are from each other. This extra distance has been found to improve detection and discrimination of radar signal phase shifts for range (carry) and spin measurements. "Non-uniform" can be defined in a variety of ways. One way is to define non-uniform as an arrangement wherein the nearest neighbor distance between at least some receive antenna pairs of the array are significantly different than the nearest neighbor distance between other receive antenna pairs of the array, or if the nearest neighbor distance between at least some transmit antenna pairs of the array are significantly different than the nearest neighbor distance between other transmit antenna pairs of the array In the embodiment of FIG. 4A, the nearest neighbor distance for antenna 80d with respect to antennas 80a, 80b, and 80c is twice as far or more than the nearest neighbor distance between 80a-80b, 80a-80c, and 80b-80c. It is advantageous if the largest nearest neighbor distance is at least 1.5 times the smallest nearest neighbor distance of the array. This ratio may be 2 or more, as in the embodiment of FIG. 4A. Another way of defining non-uniform is an array where the centers of the complete set of receive antennas, the complete set of transmit antennas, or the combined set of all receive and all transmit antennas cannot be connected as a convex polygon having the same interior angles at each vertex. If straight line connecting the centers of the antennas of an array would be considered a uniform array, interpreted as a convex polygon with all interior angles equal to zero. However, if the antennas of the array are placed on a curved line, or on two separate lines that are neither parallel nor perpendicular, such an arrangement would be non-uniform as defined herein as at least a parallelogram or trapezoid shape would be required to connect the antennas of the array.

The non-uniform kite formation of FIG. 4A has been found advantageous. In this embodiment, the four receive antennas 80a, 80b, 80c, and 80d cannot be arranged in for example, a square, as illustrated by a conventional antenna placement for antenna 80d shown in dotted lines in FIG. 4A.

Figure 4B:
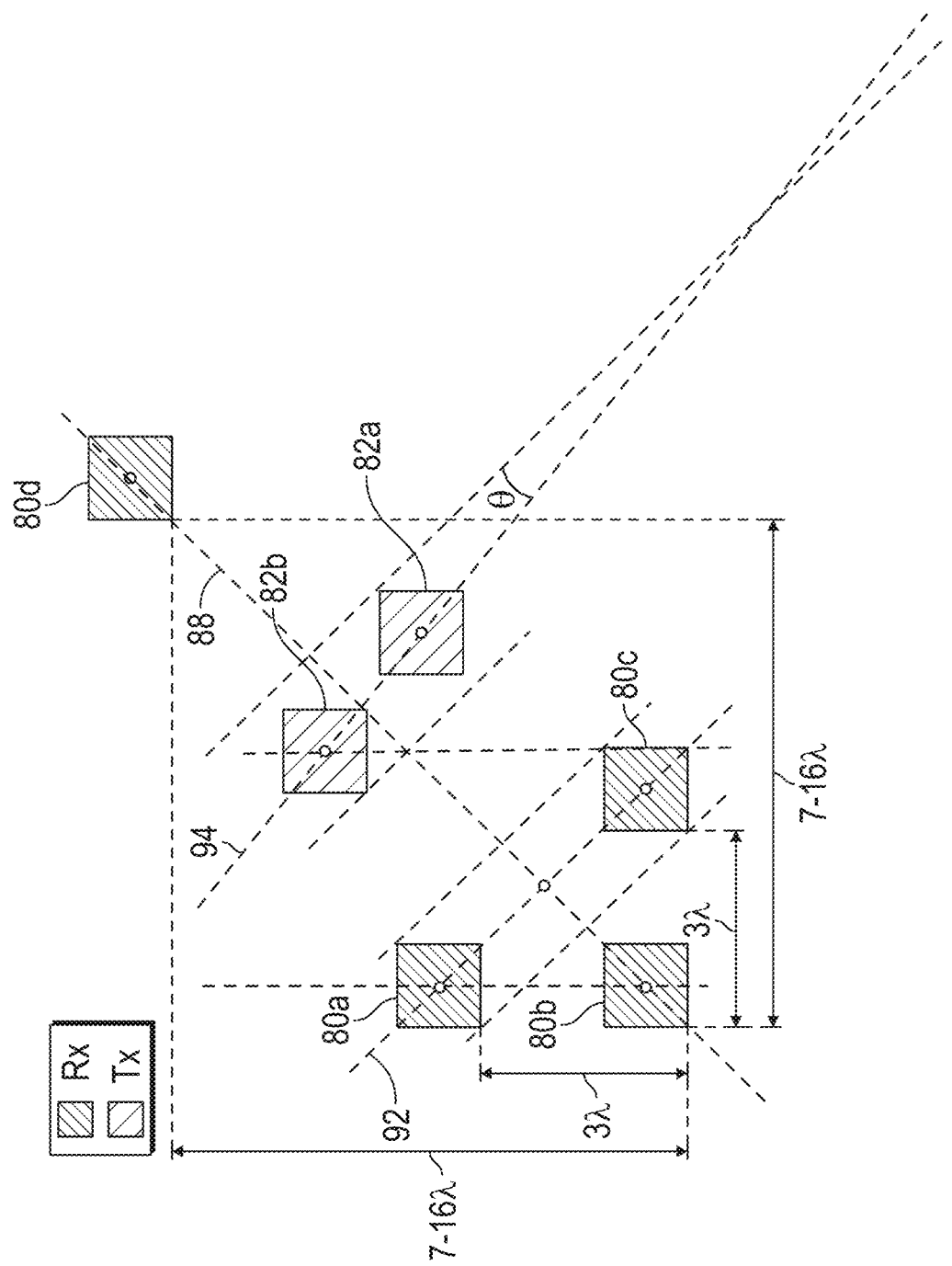

FIG. 4B illustrates another form of non-uniformity that can be incorporated into an antenna array of a launch monitor. The array of FIG. 4B is identical to the array of FIG. 4A. It may be noted here that "non-uniform" does not mean wholly lacking any symmetries. In FIG. 4B for example, it can be seen that the receive antenna placement is symmetrical around a longitudinal axis 88 of the array even though the receive antenna arrangement is non-uniform as described above. In this embodiment though, an additional non-uniformity is present with respect to the transmit antenna placement and the symmetry of the receive antenna arrangement. In this embodiment, the transmit antennas 82a and 82b are rotated around an axis perpendicular to the longitudinal axis (into and out of the page) and shifted rightward and downward in the page with respect to the longitudinal axis 88. Thus, although axis 92 connecting antennas 80a and 80c is perpendicular to the longitudinal axis 88, and the antennas 80a and 80c are spaced the same distance from the longitudinal axis 88 along axis 92, this is not true of the transmit antennas 82a and 82b that lie along axis 94. This deviation from uniformity with respect to transmit antennas compared to receive antennas also helps create a richer set of signals for estimating parameter values more accurately.

Figure 4C:
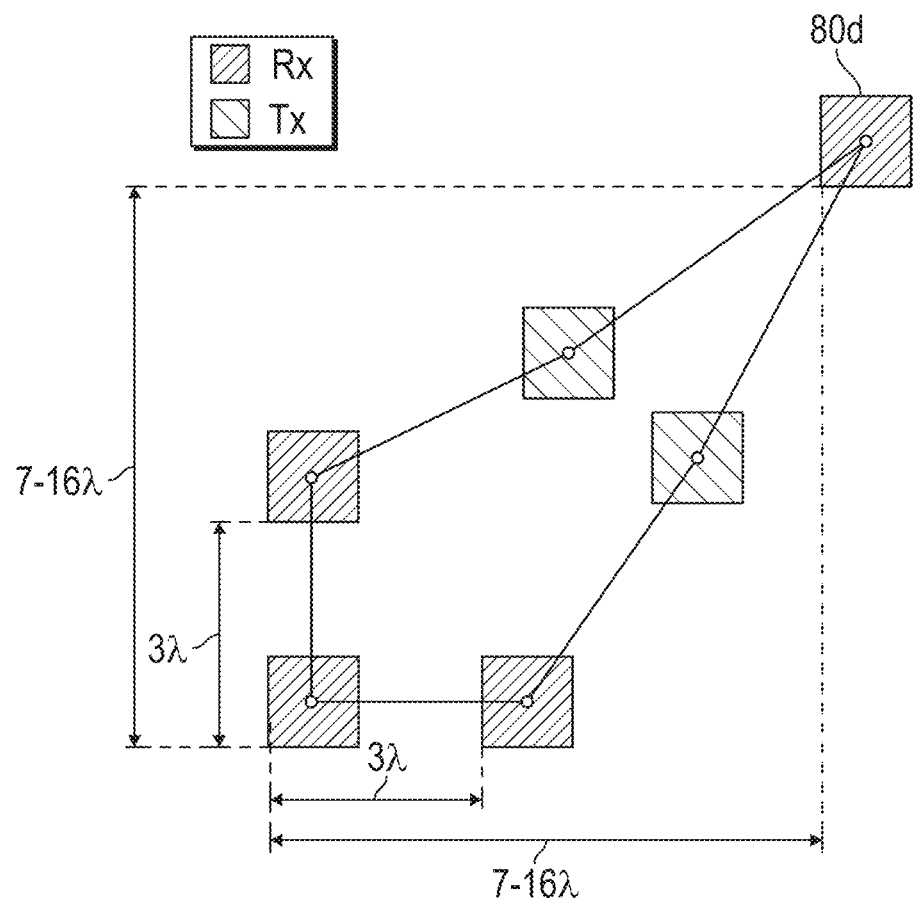

As can be seen in FIG. 4C, the rotation and shift of the transmit antennas makes the polygon formed by all of the antennas of the array (receive and transmit antennas together) non-convex and with a different interior angle at every vertex. It may therefore be said that the entire array of both receive and transmit antennas is less uniform than the arrangement of receive antennas considered alone.

An antenna array is considered "non-uniform" as that term is used herein if the receive antennas as a group are non-uniform under either definition above, if the transmit antennas as a group are non-uniform under either definition above, or if the combination of receive and transmit antennas is non-uniform under either definition above. It is advantageous if the antenna array is non-uniform under both definitions above. In the embodiment of FIGS. 4A, B, and C, the receive antenna array is non-uniform under at least one of the definitions above when considered alone, and the entire array of both receive and transmit antennas is non-uniform under at least one of the definitions above. In the array of FIGS. 4A, 4B, and 4C, the receive antennas and the entire group of antennas satisfy both definitions of non-uniform provided above. The transmit antennas cannot be non-uniform when considered by themselves separate from the receive antennas because there are only two in this embodiment.

The non-uniform radar antenna arrangements described herein are especially suitable if the above parameters that are estimated from the received radar signals are calculated using deep-learning neural network techniques rather than a collection of pre-defined function relationships between the characteristics of the received signals and the parameters to be estimated. The non-uniform nature of the data collection provides a richer set of signal features for the deep-learning program to be trained on.

Figure 5:
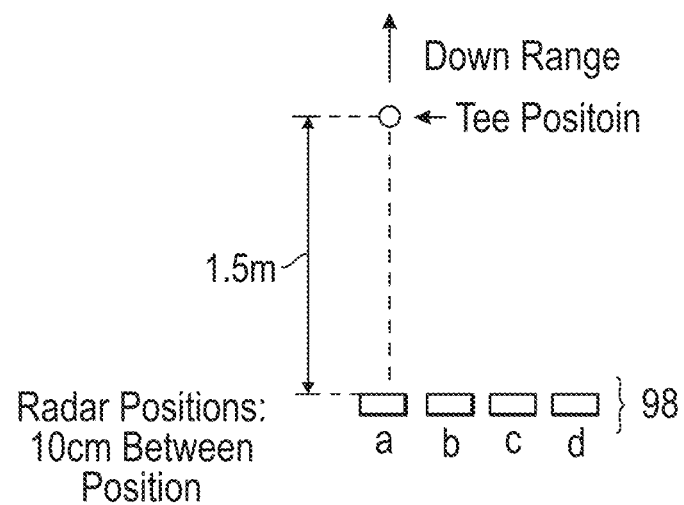
FIG. 5 illustrates an experimental set-up for measuring golf ball spin parameters with a non-uniform antenna array.
Figure 6:
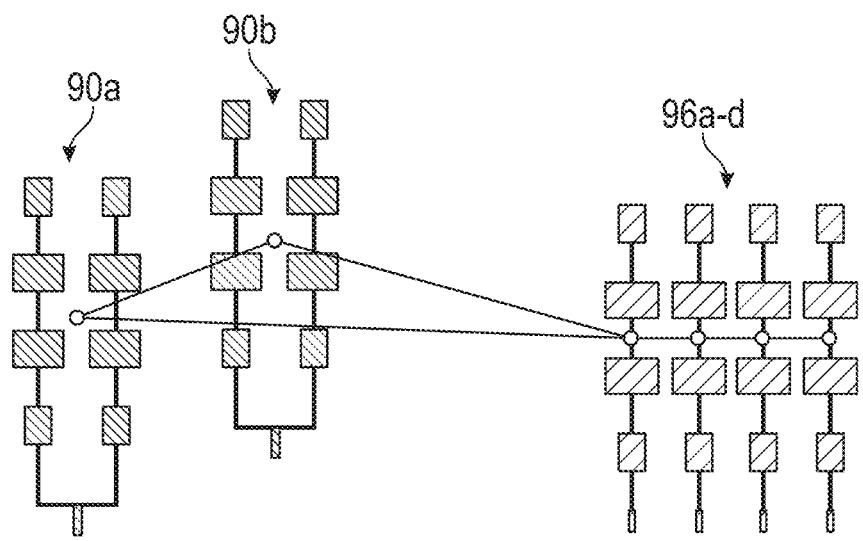
FIG. 6 illustrates a non-uniform antenna array for measuring golf ball spin parameters.
Figure 6:
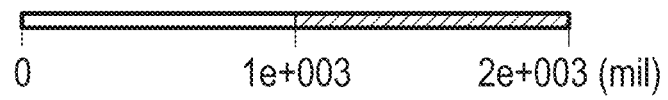

FIG. 5 and FIG. 6 illustrate an experimental set-up for testing spin rate and spin axis measurements. A 24 GHz Tx/Rx radar array was fabricated with two transmitters 90a and 90b and four receivers 96a-96d spaced about 2000 mil apart such as shown in FIG. 6. It can be seen that the combined set of receive and transmit antennas of the array of FIG. 6 is non-uniform under the polygon test, although it is a different arrangement than that shown in FIGS. 4A, 4B, and 4C. The radar antenna array was placed in four positions 98 (designated a, b, c, and d) along a line 1.5 m behind the tee and perpendicular to the down range direction. Spacing between each position was 10 cm. Data was collected for a variety of different swings producing various ball spin rates and axis orientations.

Figure 7:
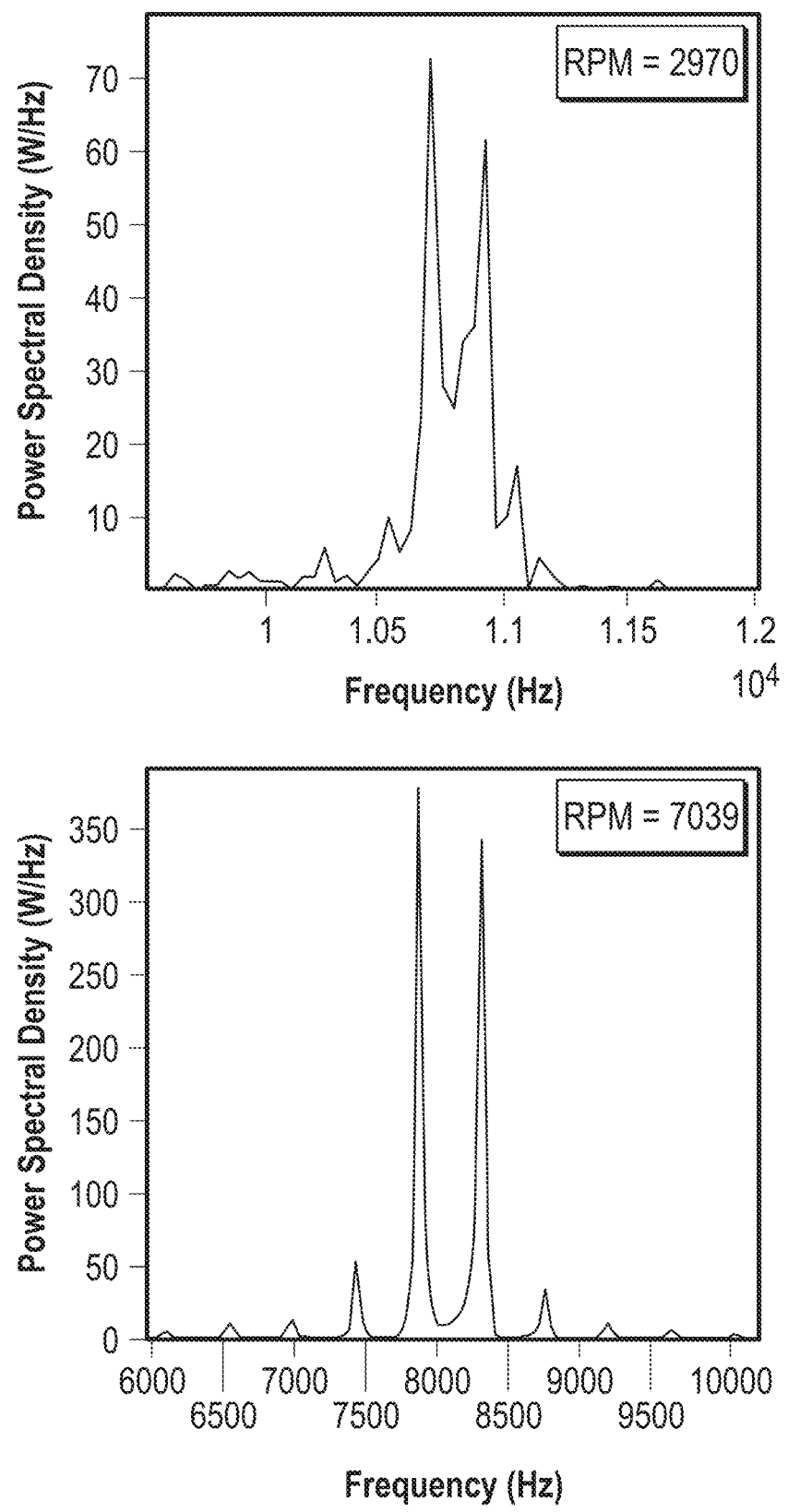
FIG. 7 is frequency domain data for estimating struck golf ball spin rate.
Figure 8:
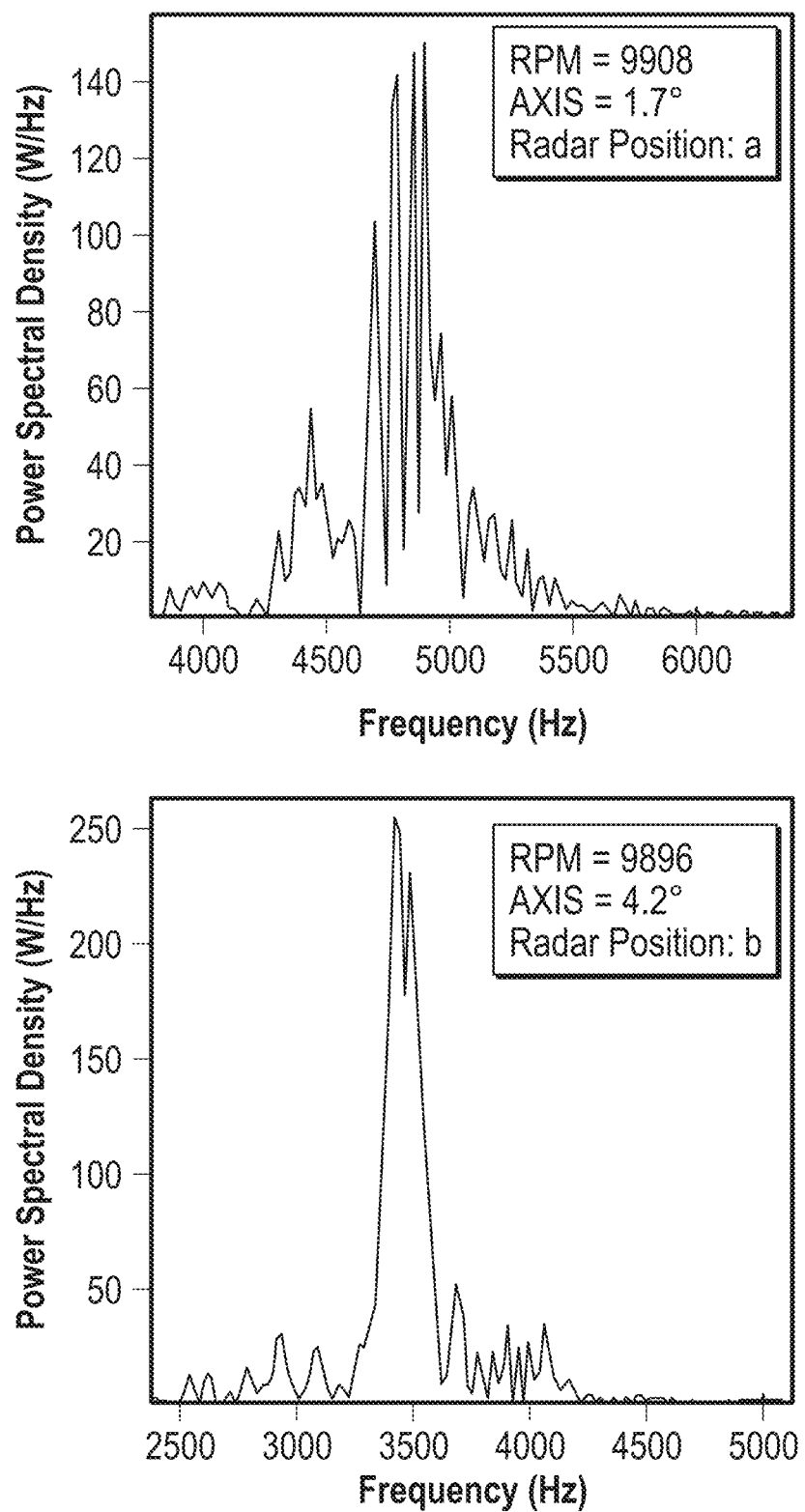
FIG. 8 is frequency domain data for estimating struck golf ball spin axis.
Figure 8:
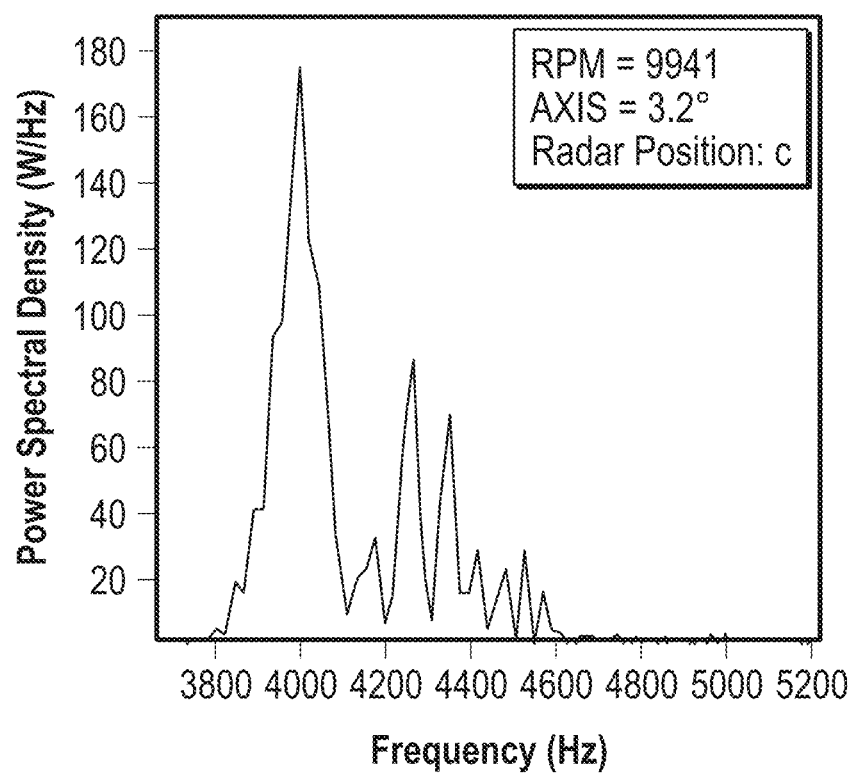

Using the radar in position a, FIG. 7 shows examples of swings that produced two different spin rates which shows the trends that can be expected from varying spin rate. Namely, the number of main peaks, spacing between main peaks, and the amplitude of these peaks demonstrate a clear distinction in the radar data between different spin rates. Using the radar in positions a, b, and c, FIG. 8 shows a similar variation in FFT features, but this variation is now due to the relative orientation between the radar and the spin axis.

General Interpretive Principles for the Present Disclosure

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, a system or an apparatus may be implemented, or a method may be practiced using any one or more of the aspects set forth herein. In addition, the scope of the disclosure is intended to cover such a system, apparatus or method which is practiced using other structure, functionality, or structure and functionality in addition to or other than the various aspects of the disclosure set forth herein. It should be understood that any aspect disclosed herein may be set forth in one or more elements of a claim. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

With respect to the use of plural vs. singular terms herein, those having skill in the art can translate from the plural to the singular and/or from the singular to the plural as is appropriate to the context and/or application. The various singular/plural permutations may be expressly set forth herein for sake of clarity.

When describing an absolute value of a characteristic or property of a thing or act described herein, the terms "substantial," "substantially," "essentially," "approximately," and/or other terms or phrases of degree may be used without the specific recitation of a numerical range. When applied to a characteristic or property of a thing or act described herein, these terms refer to a range of the characteristic or property that is consistent with providing a desired function associated with that characteristic or property.

In those cases where a single numerical value is given for a characteristic or property, it is intended to be interpreted as at least covering deviations of that value within one significant digit of the numerical value given.

If a numerical value or range of numerical values is provided to define a characteristic or property of a thing or act described herein, whether or not the value or range is qualified with a term of degree, a specific method of measuring the characteristic or property may be defined herein as well. In the event no specific method of measuring the characteristic or property is defined herein, and there are different generally accepted methods of measurement for the characteristic or property, then the measurement method should be interpreted as the method of measurement that would most likely be adopted by one of ordinary skill in the art given the description and context of the characteristic or property. In the further event there is more than one method of measurement that is equally likely to be adopted by one of ordinary skill in the art to measure the characteristic or property, the value or range of values should be interpreted as being met regardless of which method of measurement is chosen.

It will be understood by those within the art that terms used herein, and especially in the appended claims (e.g., bodies of the appended claims) are intended as "open" terms unless specifically indicated otherwise (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

In those instances where a convention analogous to "at least one of A, B, and C" is used, such a construction would include systems that have A alone, B alone, C alone, A and B together without C, A and C together without B, B and C together without A, as well as A, B, and C together. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include A without B, B without A, as well as A and B together."

Various modifications to the implementations described in this disclosure can be readily apparent to those skilled in the art, and generic principles defined herein can be applied to other implementations without departing from the spirit or scope of this disclosure. Thus, the disclosure is not intended to be limited to the implementations shown herein but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A golf ball launch monitor comprising:
   four or more radar receive antennas;
   one or more radar transmit antennas;
   a processor coupled to the plurality of radar receive antennas and the plurality of radar transmit antennas, wherein the processor is configured to process radar signals from the plurality of radar receive antennas to estimate one or more golf ball trajectory parameters;
   wherein the four or more radar receive antennas and the one or more radar transmit antennas are arranged in an array;
   wherein all but one of the four or more radar receive antennas are configured in a group, wherein the group is characterized by a largest nearest neighbor distance;
   wherein the one of the four or more radar receive antennas is at least 1.5 times farther than the largest nearest neighbor distance from each of the radar receive antennas of the group; and,
   wherein the processor is configured to process the radar signals from the four or more radar receive antennas with a deep-learning program without pre-defined functional relationships between characteristics of the radar signals from the radar receive antennas and the golf ball trajectory parameters.

2. The golf ball launch monitor of claim 1, wherein the four or more receive antennas are arranged symmetrically around a longitudinal axis.

3. The golf ball launch monitor of claim 1 comprising:
   a continuous wave radar transmitter; and
   a frequency modulated continuous wave radar transmitter.

4. The launch monitor of claim 3, wherein the processor is configured to estimate a distance between a struck golf ball and the launch monitor based at least in part on the signals transmitted by the frequency modulated continuous wave radar transmitter.

5. The launch monitor of claim 4, wherein the distance corresponds to a carry distance of the golf ball.

6. The launch monitor of claim 1, comprising exactly four radar receive antennas.

7. The launch monitor of claim 6, comprising exactly two radar transmit antennas.

8. The launch monitor of claim 6, wherein the exactly four radar receive antennas are positioned symmetrically around a longitudinal axis.

9. The launch monitor of claim 7, wherein the exactly two radar transmit antennas are positioned non-symmetrically around the longitudinal axis.

10. The launch monitor of claim 3, wherein the processor is configured to estimate club speed and ball speed based at least in part on the signals transmitted by the continuous wave radar transmitter.

11. The launch monitor of claim 3, wherein the processor is configured to estimate golf ball spin rate and spin axis based at least in part on the signals transmitted by the continuous wave radar transmitter.

12. The launch monitor of claim 3, wherein the continuous wave radar transmitter and the frequency modulated continuous wave radar transmitter are operated sequentially in a time division manner.

13. The launch monitor of claim 3, wherein the four or more receive antennas are operated simultaneously to receive both the continuous wave transmitter Doppler signal and the frequency modulated continuous wave radar transmitter Doppler signal.

14. The launch monitor of claim 3, wherein the frequency modulated continuous wave radar transmitter is configured for linear modulation.

* * * * *